United States Patent
Ookushi

(10) Patent No.: US 7,640,167 B2
(45) Date of Patent: Dec. 29, 2009

(54) SELF-SERVICE SALES MANAGEMENT SYSTEM AND METHOD, AND ITS PROGRAM

(75) Inventor: Yasunori Ookushi, Kanagawa (JP)

(73) Assignee: NEC Infrontia Corporation, Kawasaki-shi (JP)

( * ) Notice: Subject to any disclaimer, the term of this patent is extended or adjusted under 35 U.S.C. 154(b) by 1295 days.

(21) Appl. No.: 10/633,520

(22) Filed: Aug. 5, 2003

(65) Prior Publication Data

US 2004/0034574 A1 Feb. 19, 2004

(30) Foreign Application Priority Data

Aug. 16, 2002 (JP) ............................. 2002-237270

(51) Int. Cl.
*G06Q 99/00* (2006.01)
(52) U.S. Cl. ........................................................ 705/1
(58) Field of Classification Search .................. 705/1
See application file for complete search history.

(56) References Cited

U.S. PATENT DOCUMENTS

| | | | | |
|---|---|---|---|---|
| 5,013,038 A * | 5/1991 | Luxenberg et al. | ............. | 463/42 |
| 5,083,271 A * | 1/1992 | Thacher et al. | ................ | 700/92 |
| 5,114,155 A * | 5/1992 | Tillery et al. | ................ | 273/371 |
| 5,947,747 A * | 9/1999 | Walker et al. | ............... | 434/354 |
| 5,956,485 A * | 9/1999 | Perlman | .................... | 709/204 |
| 6,088,722 A * | 7/2000 | Herz et al. | ................... | 709/217 |
| 6,406,371 B1 * | 6/2002 | Baba et al. | .................... | 463/42 |
| 6,519,571 B1 * | 2/2003 | Guheen et al. | ................ | 705/14 |
| 6,544,042 B2 * | 4/2003 | Lippman | .................... | 434/322 |
| 6,606,479 B2 * | 8/2003 | Cook et al. | .................. | 434/350 |
| 6,616,453 B2 * | 9/2003 | Kouba et al. | ................. | 434/219 |
| 6,618,504 B1 * | 9/2003 | Yoshino | ....................... | 382/187 |
| 6,623,369 B1 * | 9/2003 | Shea | ........................... | 473/57 |
| 6,629,081 B1 * | 9/2003 | Cornelius et al. | ............. | 705/30 |
| 6,633,223 B1 * | 10/2003 | Schenker et al. | ............ | 340/5.53 |
| 6,791,951 B1 * | 9/2004 | Miyamoto et al. | ........... | 370/270 |
| 7,013,290 B2 * | 3/2006 | Ananian | ........................ | 705/27 |
| 7,085,800 B2 * | 8/2006 | Abbott et al. | ................ | 709/200 |
| 7,240,025 B2 * | 7/2007 | Stone et al. | .................... | 705/26 |
| 7,266,839 B2 * | 9/2007 | Bowers et al. | .................. | 726/8 |
| 2002/0199118 A1 * | 12/2002 | Yardley et al. | ............... | 713/201 |

(Continued)

FOREIGN PATENT DOCUMENTS

JP 8-161586 A 6/1996

(Continued)

*Primary Examiner*—Jonathan Ouellette
(74) *Attorney, Agent, or Firm*—Foley & Lardner LLP

(57) ABSTRACT

A skill authentication server publicizes a home page for test question creation over a communication network. The skill authentication server transmits a home page for a test question creation information input screen to a shop terminal, upon an access from the shop terminal, and receives the screen input information from the shop terminal to create a home page for skill authentication test questions. The shop terminal generates the skill authentication result that becomes the content of an ID card of the customer on the basis of the test answer information from a customer terminal that is input into the home page for skill authentication test questions, and transmits it to a card company server and the shop terminal. The customer inserts the ID card including the skill authentication result into the shop terminal and accepts a guidance suitable for the skill authentication result.

17 Claims, 9 Drawing Sheets

U.S. PATENT DOCUMENTS

| | | | |
|---|---|---|---|
| 2003/0028451 A1* | 2/2003 | Ananian | 705/27 |
| 2003/0103644 A1* | 6/2003 | Klayh | 382/100 |
| 2003/0158750 A1* | 8/2003 | Banks et al. | 705/2 |

FOREIGN PATENT DOCUMENTS

| | | | |
|---|---|---|---|
| JP | 11-011269 A | 1/1999 | |
| JP | 11-11269 A | 1/1999 | |
| JP | 11-345263 A | 12/1999 | |
| JP | 2001-048300 | 2/2001 | |
| JP | 2002-117197 A | 4/2002 | |
| JP | 2002-117197 A | 4/2002 | |

* cited by examiner

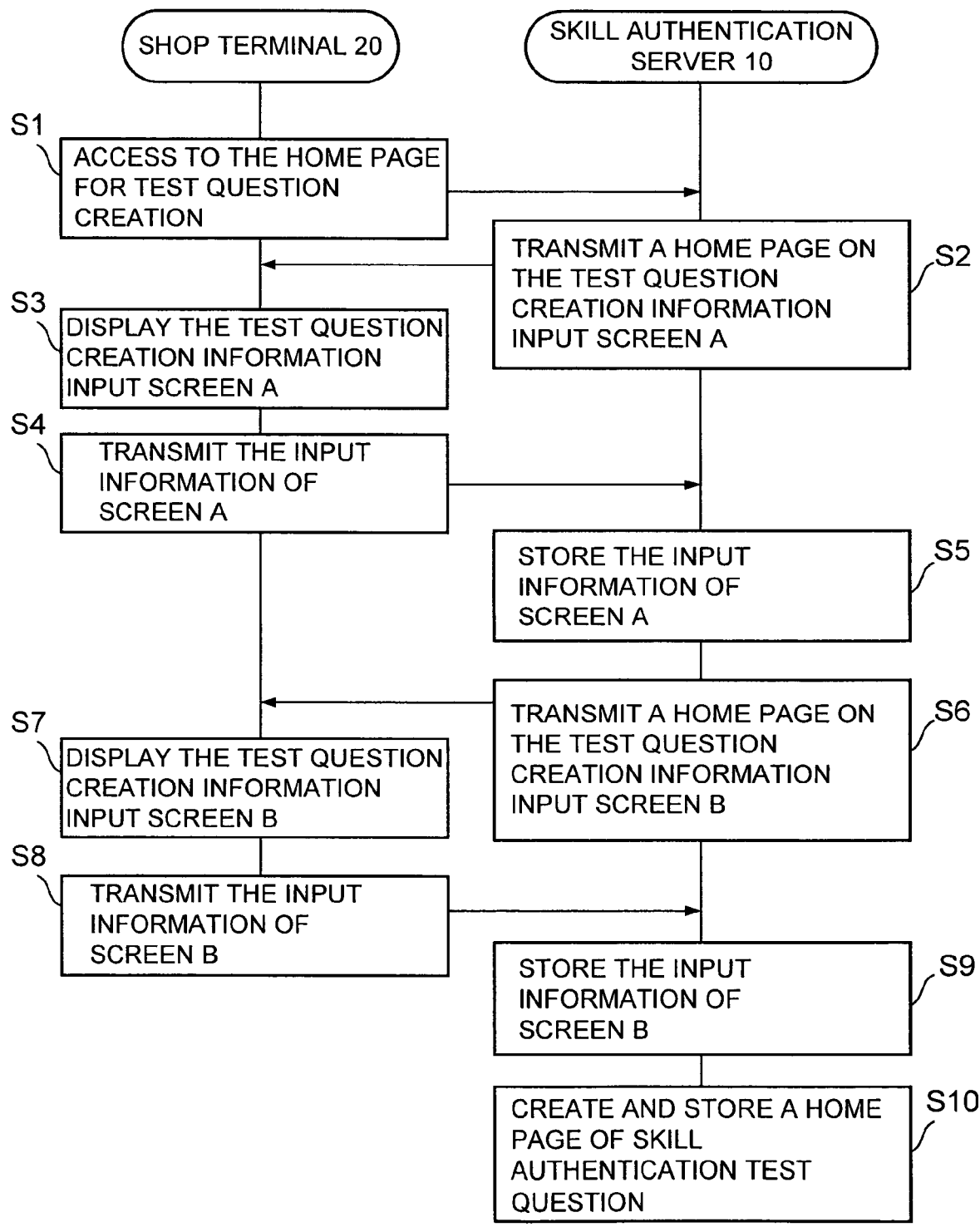

FIG. 5

Test question creation information input screen A

Kind of occupation: Gas station

Form: Self-service

Test 1: Refueling of gasoline

- Item 1: What is the kind of gasoline for your car?
  - Choice 1 of item 1: High-octane
  - Choice 2 of item 1: Regular
  - ⋮
  - Choice n of item 1: Unknown
- Item 2: Can you operate the petrol pump?
  - Choice 1 of item 2: Yes
  - Choice 2 of item 2: No Test 2: Pumping up the tire

- Item 1: Can you operate the pneumatic pressure measuring device?
  - Choice 1 of item 1: Yes
  - Choice 1 of item 1: No
  - ⋮

[Transmit]

FIG. 6

Test question creation information input screen B

| | | | |
|---|---|---|---|
| Rank | | 5 | |
| Answer ratio at rank A | 100 % | ~ | 81 % |
| Answer ratio at rank B | 80 % | ~ | 61 % |
| Answer ratio at rank C | 60 % | ~ | 41 % |
| Answer ratio at rank D | 40 % | ~ | 21 % |
| Answer ratio at rank E | 20 % | ~ | 0 % |
| Answer ratio at rank F | % | ~ | % |

Transmit

FIG. 7

Skill authentication test question screen

| | |
|---|---|
| Kind of occupation | Gas station |
| Form | Self-service |
| Test 1 | Refueling of gasoline |
| Question 1 | What is the kind of gasoline for your car? |

☐ High-octane

☑ Regular

⋮

☐ Unknown

Question 2      Can you operate the petrol pump?

☐ Yes

☑ No

Test 2      Pumping up the tire

Question 1      Can you operate the pneumatic pressure measuring device?

☐ Yes

☑ No

⋮

[ Transmit ]

SELF-SERVICE SALES MANAGEMENT SYSTEM AND METHOD, AND ITS PROGRAM

BACKGROUND OF THE INVENTION

1. Field of the Invention

The present invention relates to a self-service sales management system, a self-service sales management method, and a self-service sales management program, and more particularly to a self-service sales management system, a self-service sales management method, and a self-service sales management program for supporting a purchase act of the customer employing the self-service sales system.

2. Description of the Related Prior Art

Self-service sales have been implemented to make the sales of various commodities or services more efficient.

However, the customer (purchaser) must have some preliminary knowledge regarding a purchase commodity or service. Also, the customer (purchaser) must perform an operation (purchase act) for handling an apparatus or facility to purchase. For the customer, the operation is complex and often attended by many risks. It is difficult for a wide variety of customers to accept a single self-service.

For example, more and more gas stations of the self-service system are operated, recently. Customers have different skills in using the self-service system. A customer may need full instruction while another customer may only need instruction for steps after adjustment of pneumatic pressure without assistance. The gas station shops are desired to provide more effective services for cost reduction, but actually there is no scale for measuring a skill of the customer. If the service for which the skill of the customer is set too high is performed to curtail the expenses, there is a fear that unexpected accident may occur due to insufficient skill of the customer.

For example, there is a technique as described in Japanese Patent Laid-Open No. 2001-48300, in which a guidance is practiced using a telephone set, but there is no consideration for the skill of a customer.

SUMMARY OF THE INVENTION

A first object of the present invention is to implement a self-service system in which a customer can accept a service in accordance with the ability of the customer by determining the ability of the customer in advance so that the customer may accept an appropriate service at a shop of the self-service system.

A second object of the invention is to implement a self-service system in which the customer can accept an appropriate refueling service, without assistance of a clerk if possible, at a shop of the self-service system.

A third object of the invention is to implement a self-service system for accident prevention that is objective for the customer to prevent an accident from being caused by insufficient knowledge or misunderstanding of the customer at a shop of the self-service system.

A fourth object of the invention is to implement a self-service system in which the customer can accept a commodity or service at a lower price from a shop of the self-service system by making a skill authentication to assure a deeper knowledge of the customer to accept various kinds of services, when employing the service at the shop.

A fifth object of the invention is to implement a self-service system in which a customer such as elderly or disabled person who otherwise avoids using a shop of the self-service system informs in advance the shop of the customer personal information on his/her skill, whereby the customer can take a suitable service according to the skill of the customer.

The present invention provides a self-service sales management system, comprising:

a skill authentication server; a shop terminal; a customer terminal and a card company server; which are interconnected via a communication network, wherein said skill authentication server comprises means for creating skill authentication test questions on the basis of a screen input information, calculating a skill authentication result on the basis of a customer test answer information for the skill authentication test questions, and transmitting the customer test answer information and the skill authentication result to said shop terminal and said card company server;

said customer terminal comprises means for transmitting the customer test answer information for the skill authentication test questions to said skill authentication server;

said card company server comprises means for creating an ID card for storing the customer test answer information and the skill authentication result; and said shop terminal comprises means for transmitting the screen input information to said skill authentication server and means for making a guidance on the basis of the customer test answer information and the skill authentication result that are stored in said ID card.

The invention provides a self-service sales management method, comprising:

a step of creating a skill authentication test questions on the basis of a screen input information;

a step of calculating a skill authentication result on the basis of the customer test answer information for the skill authentication test questions;

a step of transmitting the customer test answer information and the skill authentication result;

a step of creating an ID card for storing the customer test answer information and the skill authentication result; and a step of making a guidance on the basis of the customer test answer information and the skill authentication result.

The invention provides a self-service sales management program for causing a computer to perform a process, comprising:

a step of creating a skill authentication test questions on the basis of a screen input information;

a step of calculating a skill authentication result on the basis of the customer test answer information for the skill authentication test questions;

a step of transmitting the customer test answer information and the skill authentication result;

a step of creating an ID card for storing the customer test answer information and the skill authentication result; and a step of making a guidance on the basis of the customer test answer information and the skill authentication result.

BRIEF DESCRIPTION OF THE DRAWINGS

The above and other objects, features and advantages of the present invention will become apparent from the following detailed description when taken with the accompanying drawings in which:

FIG. 4 is a flowchart showing the operation in the embodiment of the invention;

FIG. 5 is an explanatory view showing the contents of one example of a test question creation information input screen A;

FIG. 6 is an explanatory view showing the contents of one example of a test question creation information input screen B;

FIG. 7 is an explanatory view showing the contents of one example of a skill authentication test screen;

DETAILED DESCRIPTION OF THE PREFERRED EMBODIMENTS

Figure 1:
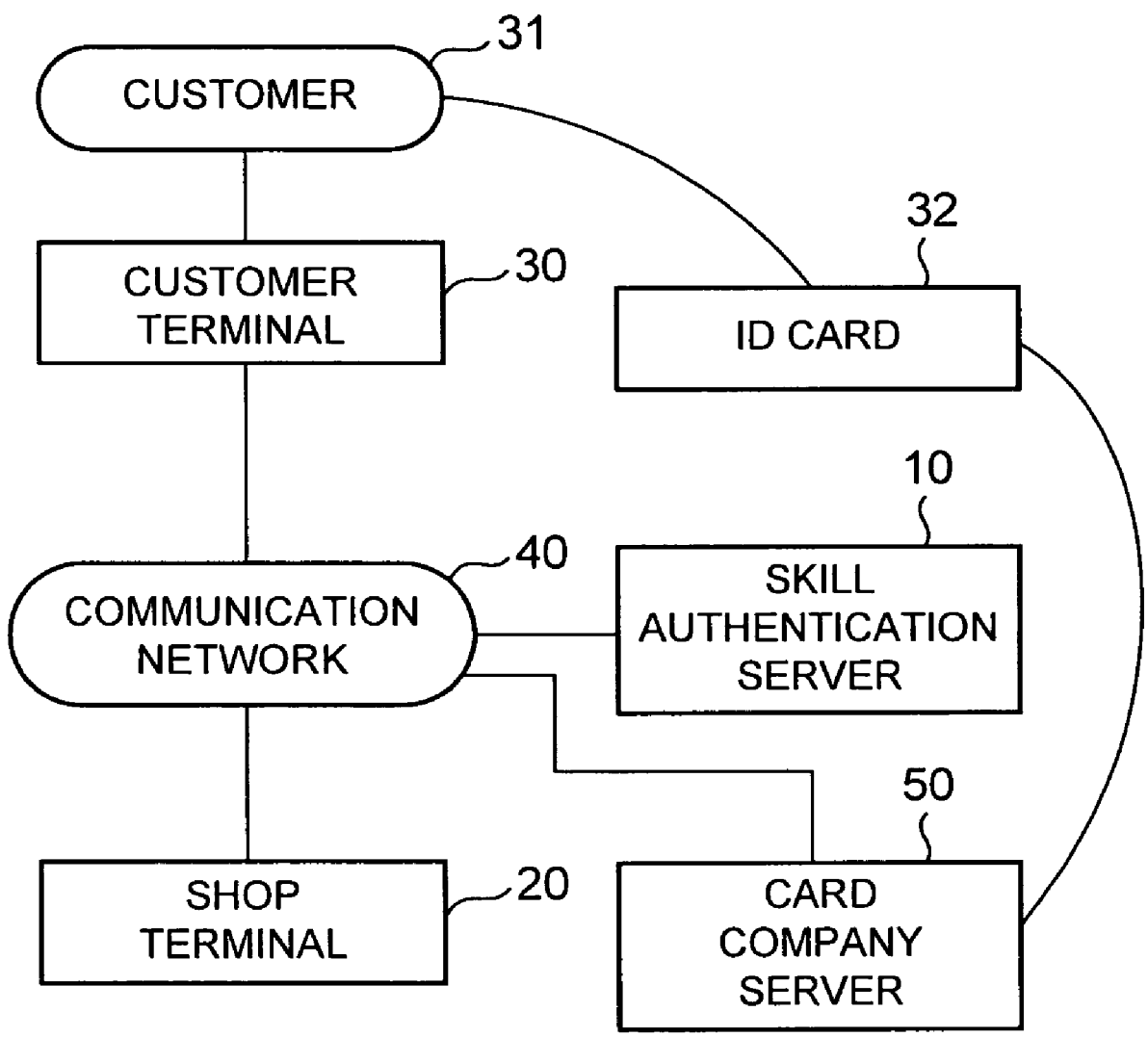
FIG. 1 is a block diagram showing the configuration of a self-service sales management system according to an embodiment of the present invention.

Referring to FIG. 1, a self-service sales management system according to an embodiment of the present invention comprises a skill authentication server 10 (computer), a shop terminal 20 (computer) placed at each shop, a customer terminal 30 (computer) operated by a customer 31, a card company server 50 (computer), a communication network 40 (e.g., Internet) connecting the skill authentication server 10, the shop terminal 20, the customer terminal 30 and the card company server 50. An ID card 32 is issued by the skill authentication server 10 and distributed to the customer 31. Also, the customer 31 inserts the ID card 32 at the shop terminal 20.

The ID card 32 may be a non-contact type IC card, a magnetic card or a bar code card.

The card company server 50 is operated by a card company that produces the card and deals with the transaction of distributing it to the customer.

Figure 2:
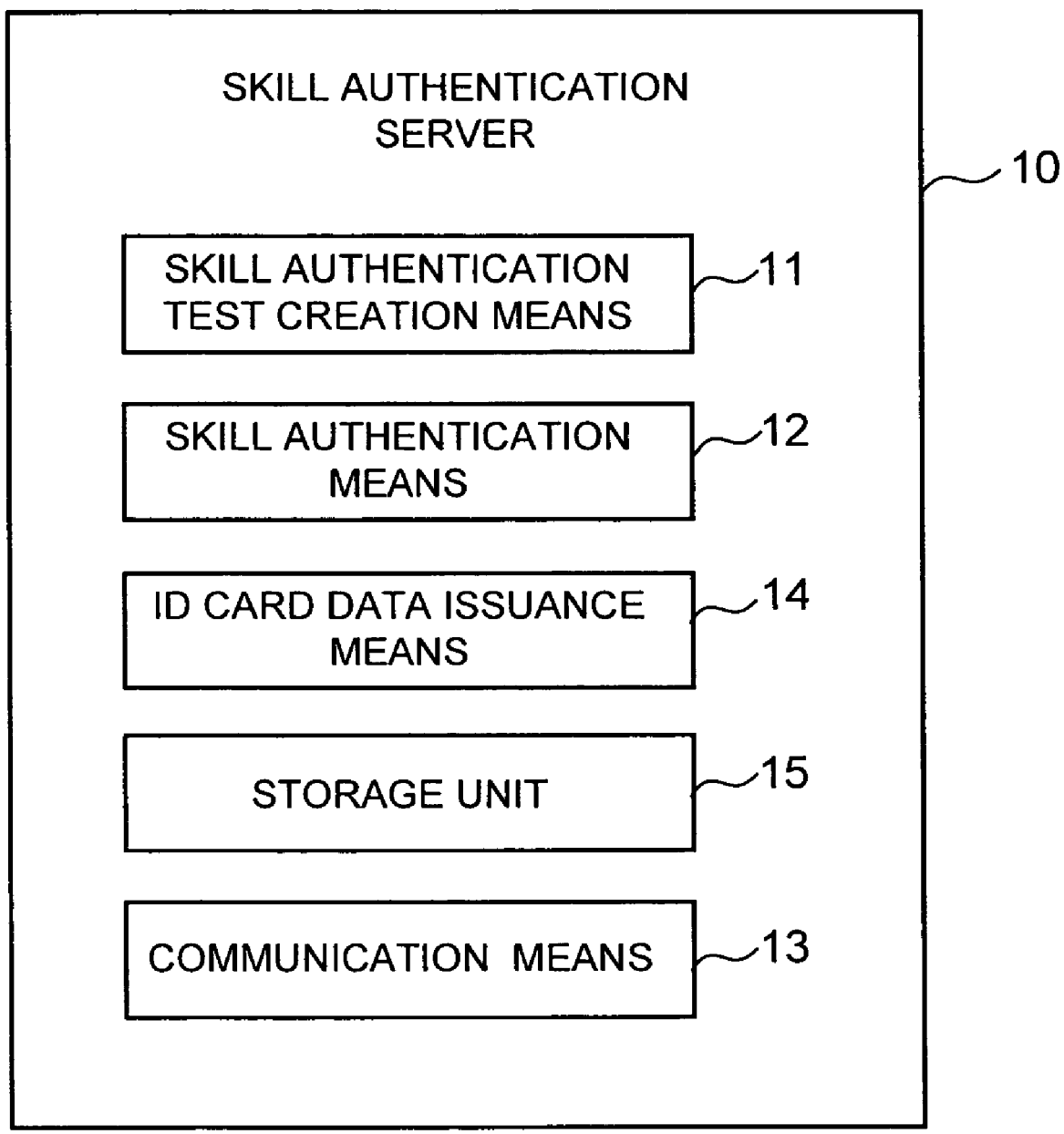
FIG. 2 is a block diagram showing the configuration of a skill authentication server of FIG. 1.

Referring to FIG. 2, the skill authentication server 10 comprises skill authentication test creation means 11, skill authentication means 12, communication means 13, ID card data issuance means 14, and storage means 15 (e.g., memory, hard disk).

The storage means 15 stores a home page for test question creation (including a test question creation information input screen A and a test question creation information input screen B) designated by a specific URL that is publicized over the communication network 40 by the skill authentication server 10, a home page for skill authentication test created by the skill authentication test creation means 11, the skill authentication result of the customer 31, a home page for inputting the personal information of the customer 31, and the personal information (name, electronic mail address, address, etc.) of the customer 31.

Figure 3:
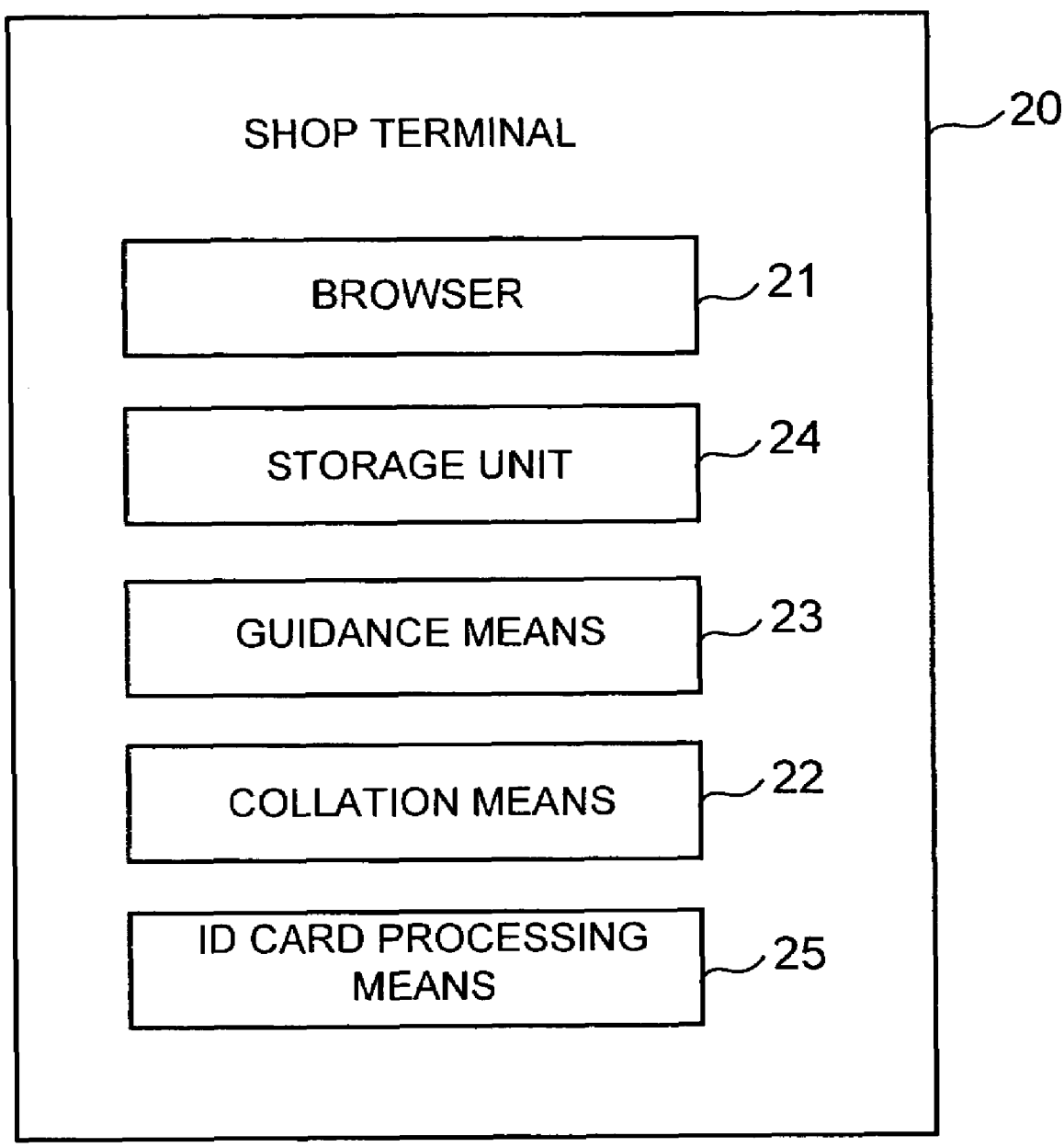
FIG. 3 is a block diagram showing the configuration of a shop terminal of FIG. 1.

Referring to FIG. 3, the shop terminal 20 comprises a browser 21 displaying the home page, collation means 22, guidance means 23, storage means 24 (memory, hard disk, etc.), and ID card processing means 25.

The operation of the self-service sales management system according to this embodiment of the invention will be described below with reference to the drawings.

Referring to FIG. 4, if to initiate the browser 21 is instructed by the operator of the shop, the shop terminal 20 initiates the browser 21. If the URL of the home page for test question creation is input into the browser 21 by the operator of the shop, the browser 21 gains access to the skill authentication server 10 via the communication network 40 (step S1).

Then, the communication means 13 of the skill authentication server 10 receives an access from the shop terminal 20, and initiates the skill authentication test creation means 11. The skill authentication test creation means 11 reads a home page of the test question creation information input screen A corresponding to the URL from the storage unit 15, and transmits it through the communication means 13 via the communication network 40 to the shop terminal 20 (step S2).

Then, the browser 21 at the shop terminal 20 receives the home page of the test question creation information input screen A and displays the test question creation information input screen A on a display unit (not shown) (step S3).

Referring to FIG. 5, the test question creation information input screen A is configured to contain the kind of occupation, the form, and the tests with items and item choices. The kind of occupation and form may be entered in a selective manner.

As shown in FIG. 5, the operator of the shop enters the kind of occupation [gas station], form [self-service], test 1 [refueling of gasoline], item 1 [What is the kind of gasoline for your car?], choice 1 of item 1 [high-octane gasoline], choice 2 of item 1 [regular], . . . , choice n of item 1 [unknown], item 2 [Can you operate the petrol pump?], choice 1 of item 2 [Yes], choice 2 of item 2 [No], test 2 [pumping up the tire], item 1 [Can you operate the pneumatic pressure measuring device?], choice 1 of item 1 [Yes], choice 2 of item 1 [No], . . . , on the test question creation information input screen A, and clicks on a transmission button, whereby the browser 21 at the shop terminal 20 transmits the input information as the screen A input information via the communication network 40 to the skill authentication server 10 (step S4).

Then, the communication means 13 of the skill authentication server 10 receives the screen A input information and passes the screen A input information to the skill authentication test creation means 11. The skill authentication test creation means 11 stores the screen A input information in the storage unit 15 (step S5). Then, the skill authentication test creation means 11 reads a home page of the test question creation information input screen B from the storage unit 15, and transmits it through the communication means 13 via the communication network 40 to the customer terminal 30 (step S6).

Then, the browser 21 at the shop terminal 20 receives the home page of the test question creation information input screen B and displays the test question creation information input screen B on the display unit (step S7).

Referring to FIG. 6, the test question creation information input screen B is configured to have the entries of a rank indicating the number of skill ranks for the customer 31 and a range of correct answer ratio at each rank (range of correct answer ratio in the test result of a skill authentication test) Each rank may be decided according to other than the answer ratio.

As shown in FIG. 6, the operator inputs the rank [5], answer ratio of rank A [100]% to [81]%, answer ratio of rank B [80]% to [61]%, answer ratio of rank C [60]% to [41]%, answer ratio of rank D [40]% to [21]% and answer ratio of rank E [20]% to [0]% and clicks on the transmission button on the test question creation information input screen B, whereby the browser 21 at the shop terminal 20 transmits the input information as the screen B input information via the communication network 40 to the skill authentication server 10 (step S8).

Then, the communication means 13 of the skill authentication server 10 receives the screen B input information and passes the screen B input information to the skill authentication test creation means 11. The skill authentication test creation means 11 stores the screen B input information in the storage unit 15 (step S9).

Then, the skill authentication test creation means 11 reads the screen A input information and the screen B input information from the storage unit 15, creates a home page for skill authentication test questions on the basis of the screen A input information and the screen B input information and stores it with a URL appended in the storage unit 15 (step S10). Then, the skill authentication test creation means 11 notifies the URL of the home page for skill authentication test questions to the skill authentication means 12.

Referring to FIG. 7, the home page for skill authentication test questions contains the kind of occupation: gas station, form: self-service, test 1: refueling of gasoline, question 1 of test 1: What is the kind of gasoline for your car?, a check box for selecting any one of "high-octane, regular, . . . , unknown", question 2 of test 1: Can you operate the petrol pump?, a check box for selecting any one of "Yes, No", test 2: pumping up the tire, question 1 of test 2: Can you operate the pneumatic pressure measuring device?, and a check box for selecting any one of "Yes, No".

Figure 8:
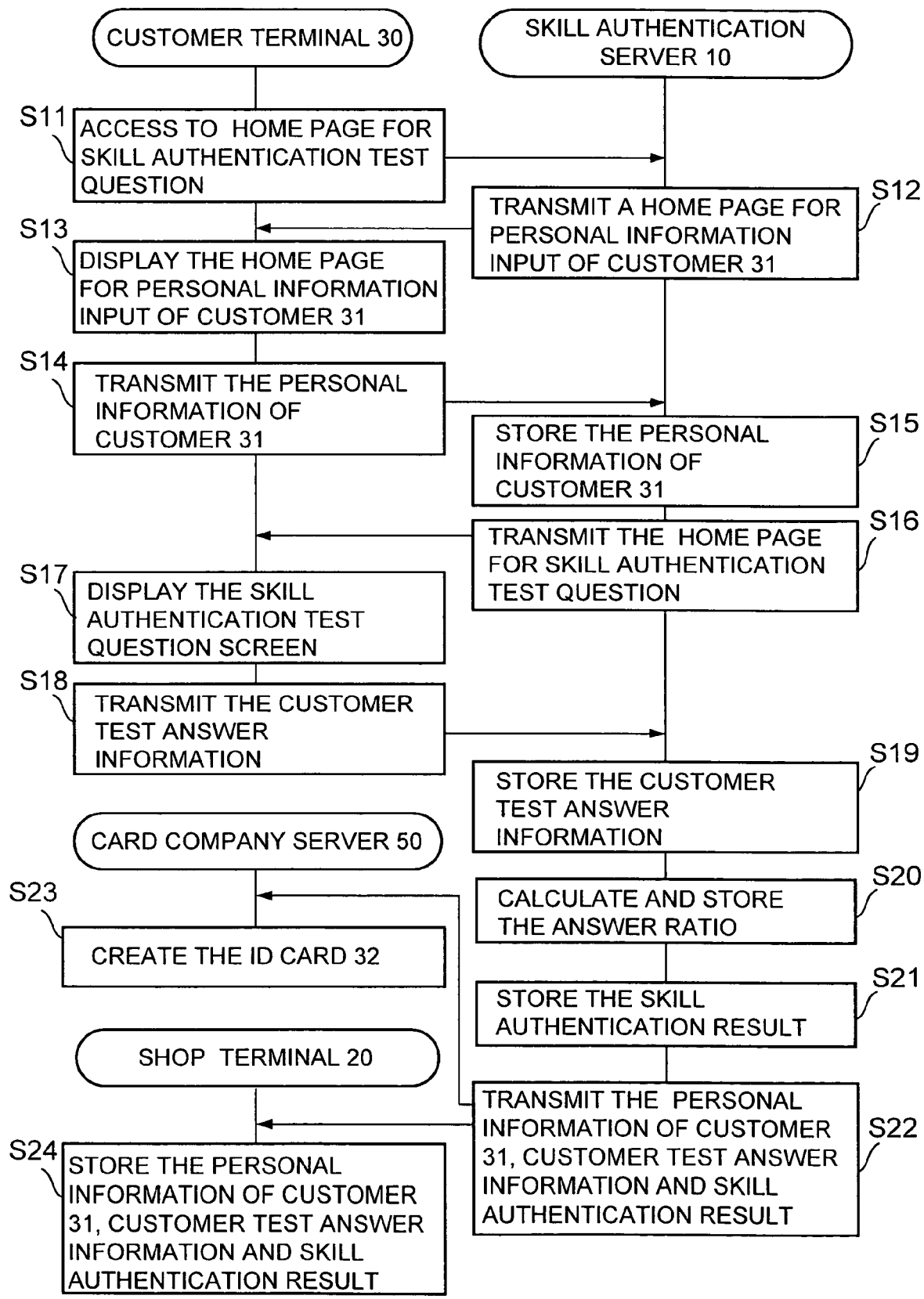
FIG. 8 is a flowchart showing the operation in the embodiment of the invention.

Referring to FIG. 8, if to initiate the browser 21 is instructed by the customer 31, the customer terminal 30 initiates the browser 21. If the URL of the home page for skill authentication test questions is input into the browser 21 by the customer 31, the customer terminal 30 gains access to the skill authentication server 10 via the communication network 40 (step S11).

Then, the communication means 13 of the skill authentication server 10 receives an access from the customer terminal 30, and initiates the skill authentication means 12. The skill authentication means 12 reads a home page for inputting the personal information of the customer 31 from the storage unit 15, and transmits it through the communication means 13 via the communication network 40 to the customer terminal 30 (step S12)

The customer terminal 30 receives the home page (not shown) for inputting the personal information of the customer 31 and displays it on the display unit (step S13). The customer 31 inputs the name, electronic mail address and address into the home page for inputting the personal information of the customer 31 and clicks on the transmission button. The customer terminal 30 transmits the input information as the personal information of the customer 31 via the communication network 40 to the skill authentication server 10 (step S14).

If receiving the personal information of the customer 31, the communication means 13 of the skill authentication server 10 passes the personal information of the customer 31 to the skill authentication means 12. Then, the skill authentication means 12 stores the personal information of the customer 31 in the storage unit 15 (step S15). Then, the skill authentication means 12 reads the home page for skill authentication test questions from the storage unit 15, and transmits it through the communication means 13 via the communication network 40 to the customer terminal 30 (step S16).

Then, the customer terminal 30 receives the home page for skill authentication test questions, and displays a skill authentication test question screen on the display unit (step S17).

As shown in FIG. 7, the customer 31 checks on "Regular" for question 1 of test 1, "No" for question 2 of test 1 and "No" for question 1 of test 2 on the skill authentication test question screen, and clicks on the transmission button, whereby the customer terminal 30 transmits the input information as the customer test answer information via the communication network 40 to the skill authentication server 10 (step S18).

Then, the communication means 13 of the skill authentication server 10 receives the customer test answer information and passes the customer test answer information to the skill authentication means 12. Then, the skill authentication means 12 stores the customer test answer information, in association with the personal information of the customer 31, in the storage unit 15 (step S19). Then, the skill authentication means 12 reads the customer test answer information from the storage unit 15, calculates the answer ratio, and stores it in the storage unit 15 (step S20)

In a skill authentication test of FIG. 4, when any other item than "unknown" is checked in question 1 of test 1, "Yes" is checked in question 2 of test 1, or "Yes" is checked in question 1 of test 2, it is considered that the "affirmative answer" is given.

For example, in the checks of the skill authentication test of FIG. 4, since "Regular" is affirmative but "No" is not affirmative, the answer ratio is equal to $\frac{1}{3}=33[\%]$.

Then, the skill authentication means 12 reads the screen B input information and the answer ratio from the storage unit 15, examines to which rank of the screen B input information the answer ratio corresponds, extracts the corresponding rank, and stores the skill authentication result, in association with the personal information of the customer 31, in the storage unit 15 (step S21). The answer ratio 33[%] corresponds to rank D. Then, the skill authentication means 12 notifies the personal information of the customer 31, the customer test answer information and the skill authentication result to the ID card data issuance means 14.

Then, the ID card data issuance means 14 transmits the personal information of the customer 31, the customer test answer information and the skill authentication result through the communication means 13 via the communication network 40 to the card company server 50 and the shop terminal 20 (step S22). The card company server 50 with a card writer creates an ID card 32 containing the personal information of the customer 31, the customer test answer information and the skill authentication result that are received, and generates the information for distributing it to the address of the customer 31 (step S23) The operator in the card company distributes the created ID card 32 to the customer 31.

The browser 21 at the shop terminal 20 stores the personal information of the customer 31, the customer test answer information and the skill authentication result in the storage unit 24 (step S24).

Figure 9:
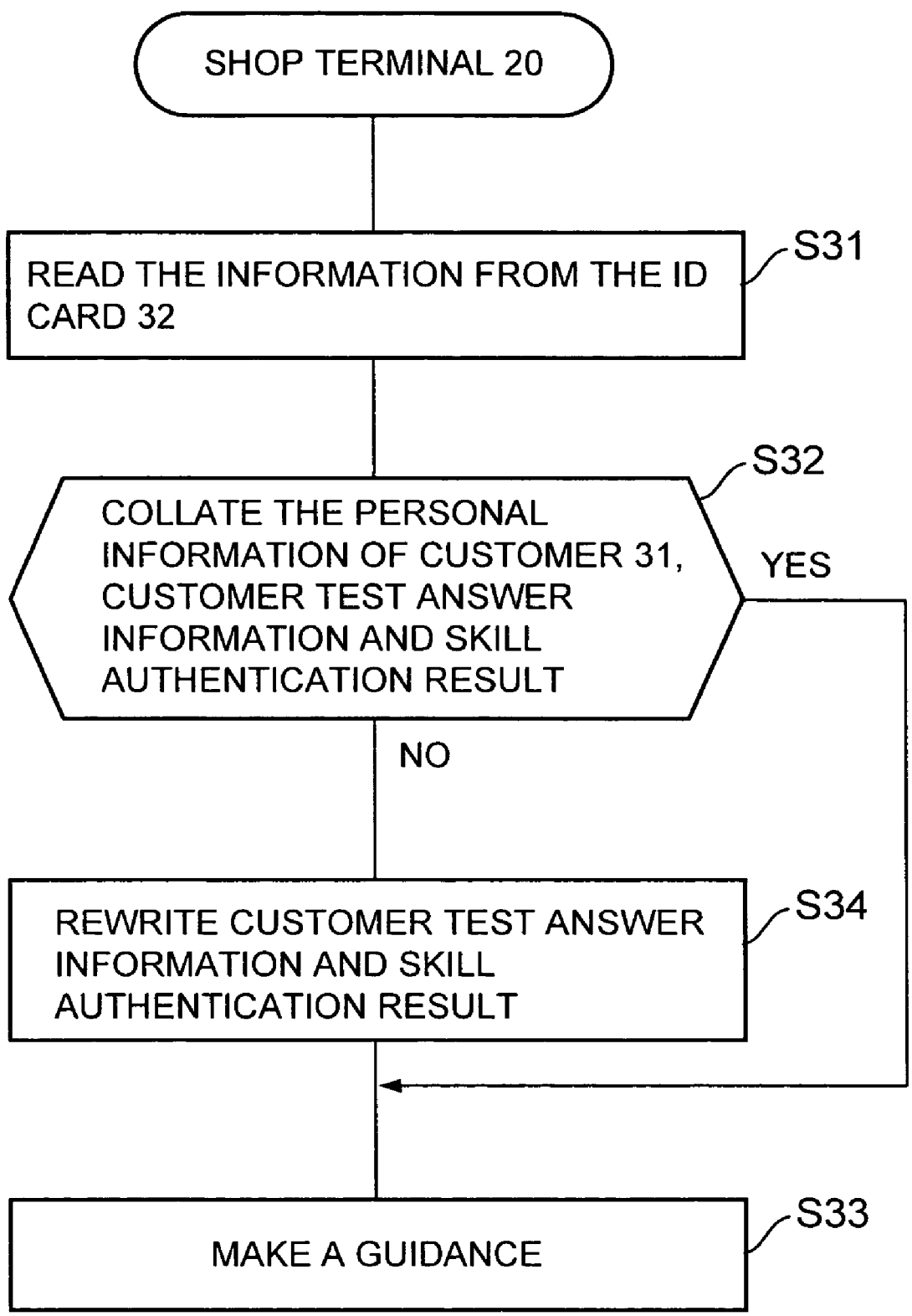
FIG. 9 is a flowchart showing the operation in the embodiment of the invention.

Referring to FIG. 9, if the customer 31 visits the shop and inserts the ID card 32 into the ID card processing means 25 of the shop terminal 20, the ID card processing means 25 reads the personal information of the customer 31, the customer test answer information and the skill authentication result that are recorded in the ID card 32 and passes them to collation means 22 (step S31). The collation means 22 compares the personal information of the customer 31, the customer test answer information and the skill authentication result that are stored in the storage unit 24 with the personal information of the customer 31, the customer test answer information and the skill authentication result from the ID card processing means 25, and initiates the guidance means 23, if matched (step S32/Yes). The guidance means 23 displays a guidance corresponding to the personal information, the customer test answer information and the skill authentication result stored in the storage unit 24 on the display unit, or makes the guidance by voice (step S33) For example, if the answer to question 1 of test 1 is "unknown", or the answer to question 1 of test 2 is "No", "Call the clerk" is displayed.

Also, the clerk at the shopper uses the skill authentication result, and if the skill authentication result is at or below a certain rank, the clerk can serve the client at once.

Also, if the personal information of the customer 31, the customer test answer information and the skill authentication result that are stored in the storage unit 24 are unmatched with the personal information of the customer 31, the customer test answer information and the skill authentication result that are stored in the ID card 32 (step S32/No), the ID card processing means 25 replaces the customer test answer information and the skill authentication result of the ID card 32 with the customer test answer information and the skill authentication result that are stored in the storage unit 24 (step S34). Then, the guidance means 23 conducts a guidance (step S33).

Since the contents of the ID card 32 are rewritten, the customer 31 may apply to the skill authentication test again, if the customer 31 has the improved skill.

The skill authentication server 10 may also have a function of the card company server 50.

Though in the above embodiment, the gasoline station is described, this invention is also applicable to other kinds of occupation.

While the present invention has been described in connection with certain preferred embodiments, it is to be understood that the subject matter encompassed by the present invention is not limited to those specific embodiments. On the contrary, it is intended to include all alternatives, modifications, and equivalents as can be included within the spirit and scope of the following claims.

What is claimed is:

1. A self-service sales management system, comprising:
   a skill authentication server; a shop terminal; a customer terminal and a card company server, which are interconnected via a communication network; wherein
   said skill authentication server comprises a skill authentication test creator for creating skill authentication test questions on the basis of a screen input information, calculating a skill authentication result on the basis of a customer test answer information for the skill authentication test questions, and transmitting the customer test answer information and the skill authentication result to said shop terminal and said card company server;
   said customer terminal comprises a communicator for transmitting the customer test answer information for the skill authentication test questions to said skill authentication server;
   said card company server comprises an ID card creator for creating an ID card for storing the customer test answer information and the skill authentication result; and
   said shop terminal comprises a transmitter for transmitting the screen input information to said skill authentication server and a guidance unit for providing guidance on the basis of the customer test answer information and the skill authentication result that are read from said ID card.

2. The self-service sales management system according to claim 1, wherein said skill authentication server comprises said skill authentication test creator for transmitting a home page of a test question creation information input screen regarding a self-service read from a storage unit, storing the screen input information input into the home page of the test question creation information input screen regarding the self-service in said storage unit, and creating a home page including the skill authentication test questions on the basis of the screen input information.

3. The self-service sales management system according to claim 1, wherein said skill authentication server comprises a skill authenticator for transmitting a home page for inputting a personal information of customer, which is read from the storage unit, storing a customer personal information input into the home page for inputting the personal information of customer in said storage unit, transmitting the home page including the skill authentication test questions, which is read from said storage unit, storing the customer test answer information that is input into the home page including the skill authentication test questions in said storage unit, deciding a skill of the customer on the basis of the customer test answer information, and storing the skill authentication result in said storage unit.

4. The self-service sales management system according to claim 1, wherein said skill authentication server comprises an ID card data issuer for transmitting the customer personal information, the test answer information and the skill authentication result that are read from said storage unit.

5. The self-service sales management system according to claim 1, wherein said skill authentication server comprises said skill authentication test creator for transmitting a home page of a test question creation information input screen regarding a self-service read from a storage unit, storing the screen input information that is input into the home page of the test question creation information input screen regarding the self-service in said storage unit, and creating a home page including the skill authentication test questions on the basis of the screen input information, a skill authenticator for transmitting a home page for inputting a personal information of customer that is read from said storage unit, storing a customer personal information that is input into the home page for inputting the personal information of customer in said storage unit, transmitting the home page including the skill authentication test questions that is read from said storage unit, storing the customer test answer information input into the home page including the skill authentication test questions in said storage unit, deciding skill of the customer on the basis of the customer test answer information, and storing the skill authentication result in said storage unit, and an ID card data issuer for transmitting the customer personal information, the customer test answer information and the skill authentication result that are read from said storage unit.

6. The self-service sales management system according to claim 1, wherein said shop terminal comprises a browser for gaining access to a home page for test question creation regarding a self-service, displaying a home page of a test question creation information input screen that is received from said skill authentication server, and transmitting the screen input information input by a operator to said skill authentication server, and a shop terminal storage unit for storing a customer personal information, the customer test answer information and the skill authentication result that are received from said skill authentication server.

7. The self-service sales management system according to claim 1, wherein said customer terminal gains access to a home page for the skill authentication test questions, displays a home page for inputting a personal information of customer that is received from said skill authentication server, transmits the personal information of customer input into the home page for inputting the personal information of customer by the customer to said skill authentication server, displays a skill authentication test question screen that is received from said skill authentication server, and transmits the customer test answer information input into the skill authentication test question screen by the customer to said skill authentication server.

8. The self-service sales management system according to claim 5, wherein said customer terminal displays a home page for inputting the personal information of customer that is received from said skill authentication server, transmits the customer personal information input into the home page for inputting the personal information of customer by the customer to said skill authentication server, displays the home page including the skill authentication test questions that is received from said skill authentication server, and transmits the customer test answer information input into the home page including the skill authentication test questions by the customer to said skill authentication server.

9. The self-service sales management system according to claim 6, wherein said shop terminal comprises ID card processor for reading the customer personal information, the test answer information and the skill authentication result that are stored in an ID card, and rewriting the customer personal information, the test answer information and the skill authentication result with the customer personal information, the test answer information and the skill authentication result that are stored in the storage unit of said shop terminal upon a rewrite instruction, a collator for comparing the customer personal information, the test answer information and the skill authentication result from said ID card processor with the customer personal information, the test answer information and the skill authentication result that are stored in the storage unit of said shop terminal, and outputting the rewrite instruction to said ID card processor, if they are unmatched, and a guidance unit for making a guidance on the basis of the customer personal information, the test answer information and the skill authentication result that are stored in the storage unit of said shop terminal.

10. The self-service sales management system according to claim 8, wherein said shop terminal comprises an ID card processor for reading the customer personal information, the test answer information and the skill authentication result that are stored in an ID card, and rewriting the customer personal information, the test answer information and the skill authentication result with the customer personal information, the test answer information and the skill authentication result that are stored in the storage unit of said shop terminal upon a rewrite instruction, a collator for comparing the customer personal information, the test answer information and the skill authentication result from said ID card processor with the customer personal information, the test answer information and the skill authentication result that are stored in the storage unit of said shop terminal, and outputting the rewrite instruction to said ID card processor, if they are unmatched, and a guidance unit for making a guidance on the basis of the customer personal information, the test answer information and the skill authentication result that are stored in the storage unit of said shop terminal.

11. A self-service sales management method, comprising:
creating skill authentication test questions on the basis of a screen input information;
providing the skill authentication test questions to a customer:
receiving a customer test answer information from the customer:
calculating a skill authentication result on the basis of the customer test answer information for the skill authentication test questions;
transmitting the customer test answer information and the skill authentication result;
creating an ID card for storing the customer test answer information and the skill authentication result; and
automatically providing guidance on the basis of the customer test answer information and the skill authentication result read from said ID card.

12. A self-service sales management method, comprising:
displaying a home page of a test question creation information input screen;
transmitting a screen of test question input information input by an operator;
storing a customer personal information, a customer test answer information and a skill authentication result in a storage unit of a shop terminal;
reading a customer personal information, a customer test answer information and a skill authentication result that are stored in an ID card;
rewriting the customer personal information, the customer test answer information and the skill authentication result stored in said ID card with the customer personal information, the customer test answer information and the skill authentication result that are stored in the storage unit of said shop terminal upon a rewrite instruction;
comparing the customer personal information, the customer test answer information and the customer skill authentication result from said ID card with the customer personal information, the customer test answer information and the skill authentication result that are stored in the storage unit of said shop terminal, and outputting the rewrite instruction, if they are unmatched; and
automatically providing guidance on the basis of the customer personal information, the customer test answer information and the skill authentication result that are stored in the storage unit of said shop terminal and read from said ID card.

13. A self-service sales management program, embodied in a computer-readable medium, for causing a computer to perform a process, comprising:
creating a skill authentication test questions on the basis of a screen input information;
calculating a skill authentication result on the basis of the customer test answer information for the skill authentication test questions;
transmitting the customer test answer information and the skill authentication result;
creating an ID card for storing the customer test answer information and the skill authentication result; and
providing guidance on the basis of the customer test answer information and the skill authentication result read from said ID card.

14. A self-service sales management program, embodied in a computer-readable medium, for causing a computer to perform a process, comprising:
displaying a home page of the test question creation information input screen;
transmitting a screen input information input by an operator;
storing a customer personal information, a customer test answer information and a skill authentication result in a storage unit of a shop terminal;
reading a customer personal information, a customer test answer information and a skill authentication result that are stored in an ID card;
rewriting the customer personal information, the customer test answer information and the skill authentication result stored in said ID card with the customer personal information, the customer test answer information and the skill authentication result that are stored in the storage unit of said shop terminal upon a rewrite instruction;
comparing the customer personal information, the test answer information and the customer skill authentication result from said ID card with the customer personal information, the customer test answer information and the skill authentication result that are stored in the storage unit of said shop terminal, and outputting the rewrite instruction, if they are unmatched; and providing guidance on the basis of the customer personal information, the customer test answer information and the skill authentication result that are stored in the storage unit of said shop terminal and read from said ID card.

15. A self-service sales management system, comprising:

a skill authentication server; a shop terminal; a customer terminal and a card company server, which are interconnected via a communication network; wherein said skill authentication server comprises means for creating skill authentication test questions on the basis of a screen input information, calculating a skill authentication result on the basis of a customer test answer information for the skill authentication test questions, and transmitting the customer test answer information and the skill authentication result to said shop terminal and said card company server;

said customer terminal comprises means for transmitting the customer test answer information for the skill authentication test questions to said skill authentication server;

said card company server comprises means for creating an ID card for storing the customer test answer information and the skill authentication result; and said shop terminal comprises means for transmitting the screen input information to said skill authentication server and means for providing guidance on the basis of the customer test answer information and the skill authentication result that are read from said ID card.

16. A self-service sales management method, comprising:

a step of creating a skill authentication test questions on the basis of a screen input information;

a step of calculating a skill authentication result on the basis of the customer test answer information for the skill authentication test questions;

a step of transmitting the customer test answer information and the skill authentication result;

a step of creating an ID card for storing the customer test answer information and the skill authentication result; and a step of automatically providing guidance on the basis of the customer test answer information and the skill authentication result read from said ID card.

17. A self-service sales management program, embodied in a computer-readable medium, for causing a computer to perform a process, comprising:

a step of creating a skill authentication test questions on the basis of a screen input information;

a step of calculating a skill authentication result on the basis of the customer test answer information for the skill authentication test questions;

a step of transmitting the customer test answer information and the skill authentication result;

a step of creating an ID card for storing the customer test answer information and the skill authentication result; and a step of providing guidance on the basis of the customer test answer information and the skill authentication result read from said ID card.

* * * * *